April 23, 1968  P. E. SHAFER  3,379,989
RADIATION-TOLERANT TRANSISTOR SENSE PREAMPLIFIER
Filed Feb. 17, 1964  4 Sheets-Sheet 1

INVENTOR.
PHILIP E. SHAFER 3,379,989
RADIATION-TOLERANT TRANSISTOR SENSE
PREAMPLIFIER
Philip E. Shafer, Holmes, Pa., assignor to Burroughs Corporation, Detroit, Mich., a corporation of Michigan
Filed Feb. 17, 1964, Ser. No. 345,321
4 Claims. (Cl. 330—28)

The present invention relates to transistor preamplifiers for sensing and amplifying low-level signal voltages. More particularly, it relates to such a preamplifier having a high tolerance of nuclear radiation.

The injurious effects of radiation upon electronic circuitry are well known. It is also well known that these effects are especially deteriorating upon semiconductors used in such circuitry.

A major type of nuclear radiation is the flux path of a neutron particle. Neutrons are divided into classes corresponding to their energy level. Those having energy levels within a specified range above intermediate neutrons are known as fast neutrons. Fast neutrons have energy levels between twenty thousand and ten million electron volts. Fast neutrons are also described as those which can produce, upon collision, recoil protons of substantial energies. It has been found that extended exposure to fast neutron flux having a certain line density (integrated fast neutron flux in neutrons/cm.$^2$) has different effects upon different semiconducting materials. On germanium, for example, the effect of fast neutron radiation has been catastrophic. Fast neutron bombardment has been found to cause conversion of germanium material between P and N types. However, because germanium has a higher minority carrier diffusion constant $D_b$ and a higher base lifetime damage constant K, much work has been in the analysis and application of germanium transistors. Silicon, on the other hand, while affected, does not undergo such conversion.

The requirements of nuclear powered flight are particularly severe. Exposures to fast neutrons with energies above 0.1 million electron volts may exceed concentrations of $10^{16}$ nvt (neutrons per centimeter$^2$). At this level designers have, up until now, been forced to rely upon the metal ceramic vacuum tubes. Recently silicon semiconductor diodes have been successfully used in a magnetic amplifier at a radiation environment of $10^{16}$ nvt. This magnetic amplifier is discussed in detail in an article in the I.E.E.E. Transactions on Nuclear Science, vol. NS10, No. 5, pp. 93 to 103, November 1963, entitled "A Radiation Tolerant Magnetic Amplifier," by N. Frank Poblenz and B. W. Howard. The present invention proposes a circuit in which a silicon transistor has been successfully used in the same environment.

Fast neutron radiation affects the minority carrier lifetime of both P and N type silicon. Thus, one mode of silicon transistor failure by radiation is loss of gain by atomic displacement which damages the minority carriers by reducing their lifetimes. This effect is discussed at length in engineering and physical literature. It is noted, for example, in the Journal of Applied Physics, vol. 29, pp. 35 to 40 in January of 1958, in an article entitled "Analysis of the Effect of Nuclear Radiation on Transistors," by J. J. Loferski. It is considered further in the proceedings of the I.R.E., vol. 46, pp. 1038 to 1044, June 1958, in an article entitled, "The Effects of Neutron Irradiation on Germanium and Silicon," by G. C. Messenger and J. P. Spratt. It is also noted in the proceedings of the I.R.E., vol. 45, pp. 931 to 937, June 1957, in an article entitled, "The Effect of Nuclear Radiation on Selected Semiconductor Devices," by G. L. Keister and H. V. Stewart. Consideration of these articles will show conclusively that for transistors exposed to heavy concentration of fast neutron radiation the $\Delta$ change in the inverse of forward D.C. circuit gain, $$\Delta\left(\frac{1}{\beta}\right)$$

is directly proportional to the integrated flux $\Phi$. Mathematically, this may be shown:

$$\Delta = \frac{1}{\beta} KW^2 \Phi \tag{1}$$

where W is the effective base width and K is a constant which describes the relative radiation sensitivity. The effective base width W can be evaluated in a terminal parameter of the transistor, known as alpha cutoff frequency $f\alpha$. Thus:

$$f\alpha = \frac{1.22D}{\pi W^2} \tag{2}$$

where D is the diffusion constant of the base semiconductor material.

For transistors having the same base semiconducting material a normalization is possible as to alpha cutoff frequency. Such transistors may then be compared by degradation in current gain $\Delta\beta$ with respect to various radiation doses.

It is clear from these equations that the usefulness of any transistor in a radiation environment is limited by the minimum allowable gain and by the effective base width of the transistor. The usefulness of germanium is limited, as previously discussed, by its resistivity conversion possibilities. In addition, increase in leakage current and decrease in usable breakdown voltage (reverse bias voltage limits) dominate the decrease in gain.

Generally silicon has not been used above $10^{14}$ nvt because of its severe loss of current gain. However, in amplifier applications, all that is actually required is power gain; current gain is merely convenient. The present invention uses this as a basis to provide a radiation-tolerant transistor amplifier. For example, such an amplifier could be used as a preamplifier to sense and amplify voltage signals from a core rope memory in a radiation-tolerant computer application.

It is therefore, an object of the present invention to provide a semiconductor amplifying circuit which possesses a high tolerance toward the detrimental effects of radiation.

It is also an object of this invention to provide a transistor amplifier which is capable of sensing a very low signal input voltage while resisting the deteriorating effects of heavy doses of fast neutrons.

It is still a further object of this invention to provide a transistorized sense preamplifier capable of satisfactory performance for more substantial periods in the presence of, and following exposure to, doses of fast neutrons having energy levels above 100,000 electron volts (0.1 mev.) and a concentration which exceeds $10^{16}$ neutrons per centimeter$^2$ ($16^{16}$ nvt.).

It is still a further object of this invention to provide a transistor amplifier operative in the common base mode to provide a power gain therefrom in spite of radiation deterioration in the minority carrier lifetime.

Various other objects and advantages will appear in the following description of one embodiment of the invention and the novel features will be particularly pointed out hereinafter in connection with the appended claims. The invention itself, however, may be best understood by reference to the following description taken in connection with the drawings wherein:

Figure 1:
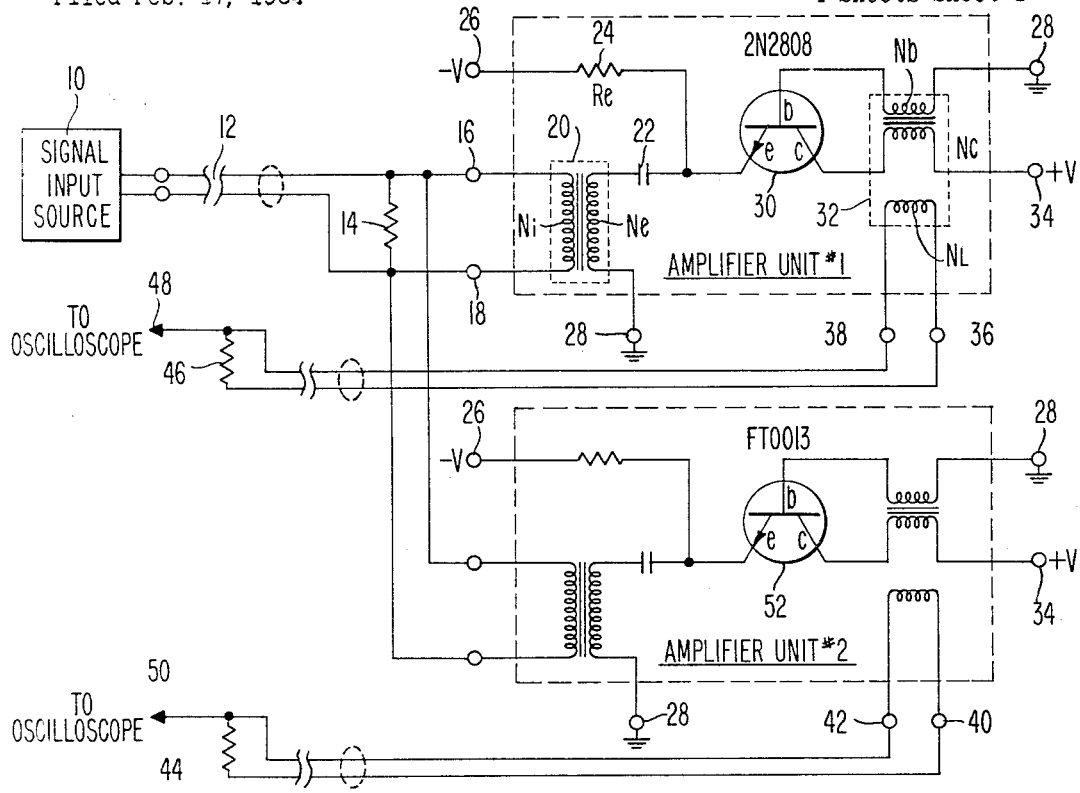
FIGURE 1 is a schematic diagram of a first ad second transistor amplifier circuit. In both instances the circuits are identical except for a transistor type difference.
Figure 1:
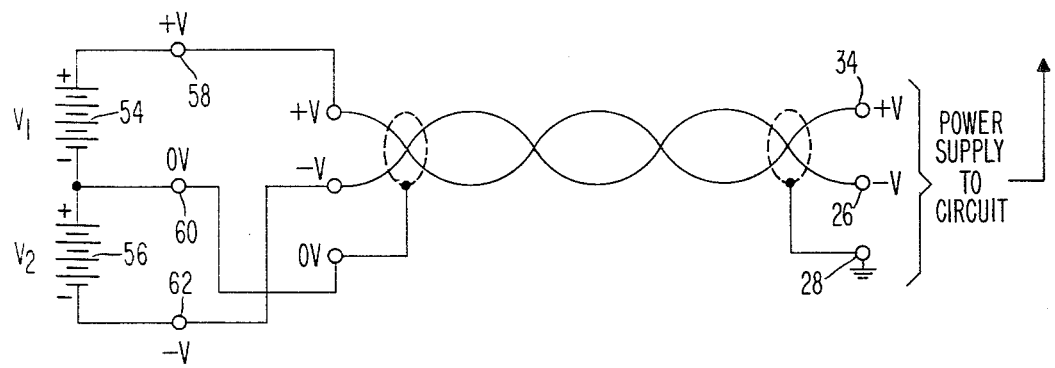
Figure 2:
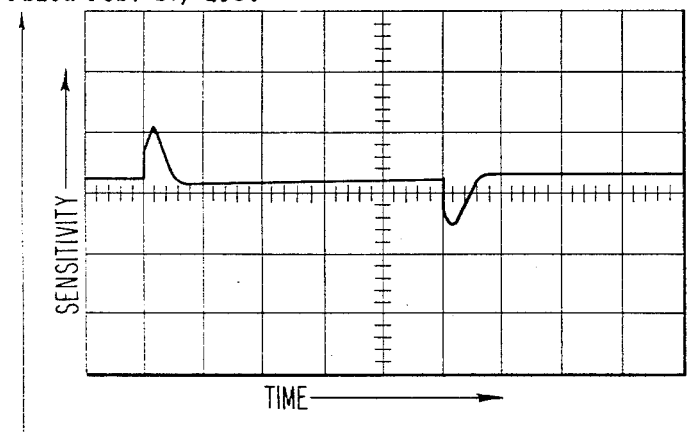
FIGURES 2A, 2B and 2C are waveform representations of the input signal in respect to output signals of the two circuits shown in FIGURE 1.
Figure 2:
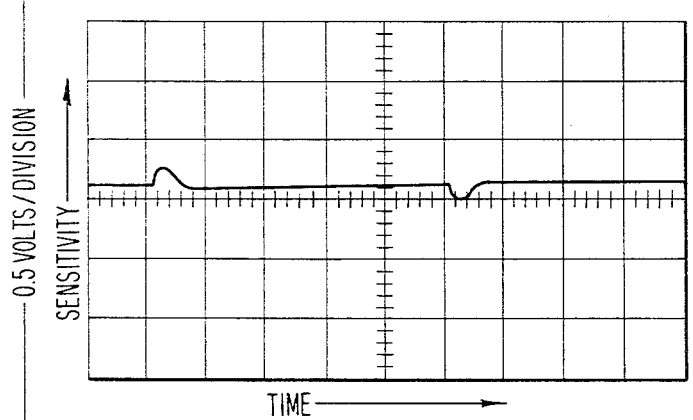
Figure 2:
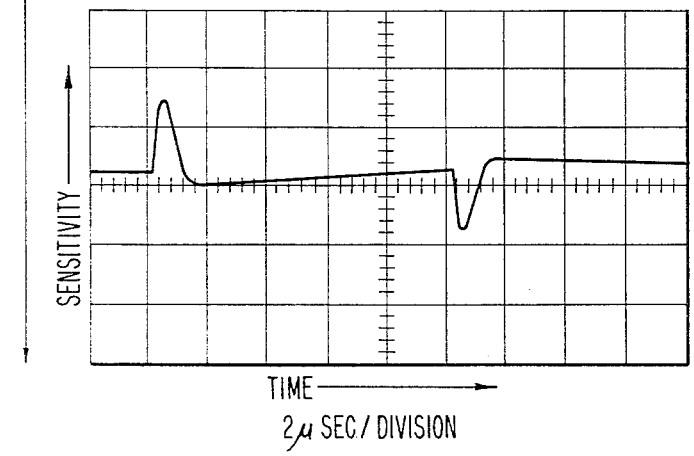

To more easily appreciate the present invention, consider the operational theory of the P-N junction of a transistor.

A P-N junction is created when P type and N type material are bonded to form a single crystal. Under ambient conditions N type material has a surplus of electrons, and electrical conduction is primarily a conduction band electron drift. In P type material, however, there is a hole surplus and electrical conduction is primarily a valence band hole drift. When a P and an N material are physically joined there is an immediate carrier diffusion which results in some electrons from the N region crossing the boundary between materials while some holes from the P region are migrating in the other direction toward the opposite material. After crossing the junction an electron from the N region will find itself in an area having a high concentration of holes. Recombination of these surplus electrons with the great availability of holes is probable at this point, and some of the electrons are thereby annihilated as carriers. A similar process can be visualized where holes from the P region cross the junction. Since each region was originally electrically neutral, electron hole recombinations on both sides and in the vicinity of the junction will result in layers of ionized acceptors in the P region and ionized donors in the N region. Therefore, the P region has experienced a net accumulation of negative charge, the N region a net accumulation of positive charge. This charge buildup continues until an equilibrium condition prevails and further carrier diffusion across the junction is discouraged by the repelling force between the carrier and the charge concentration across the boundary.

With an understanding of a P-N junction operation will come some insight into the common junction transistor operation. The common junction transistor is created by merely joining two such rectifying P-N sections. For example, if two N-P junctions are sandwiched together at their N material sides, a transistor known as P-N-P type would be created. Alternately, if two P-N junctions were joined to form a central common P material, an N-P-N transistor would be formed. In the usual triode transistor configuration, of either the P-N-P or the N-P-N type, the two outside materials are always the emitter and collector electrodes. The central material, whether it be of the N or the P type, will always form the base electrode for the triode transistor. Amplifier operation of the transistor is not possible until the transistor is properly biased. This is accomplished by the application of certain voltage levels to the selected electrodes. If a transistor is considered, as in the illustrated configuration of FIGURE 1, the biasing arrangement necessary is that for an N-P-N transistor in its common base mode.

It is well known that a transistor signal amplifier, when operated in its "active" state, will have its base emitter junction forward biased and its base collector junction reverse biased. To forward-bias a junction, the polarity of the voltage applied to a respective electrode will correspond in a positive or a negative manner with the corresponding P and N notations of the material of the electrode. Thus, to forward-bias the base-to-emitter junction, the positive voltage would be applied to the P material and a negative voltage connected to the N material. Alternately, to reverse-bias the base-to-collector junction, voltages of opposite polarity are connected to material type. Thus, in the reverse bias arrangement the positive voltage is connected to an N material, and a negative voltage to a P material.

Forward biasing of the emitter base junction will cause minority carriers, namely electrons, from the emitter N region to be injected into the base region. The higher the forward bias, the greater will be the emitter electron flow. A unique feedback network is utilized to increase this bias as the gain is decreased by radiation.

Referring now to FIGURE 1, there is shown a pair of identical amplifying circuits. In each, the transistor is connected in the common base mode. Because of the duality, only one will be considered in detail, the operational explanation being applicable to both units. Two are shown to indicate the complete test circuit used to achieve the results noted in FIGURES 3 and 4.

Since the operation of the second amplifying unit containing the second transistor type is operationally identical to the amplifier just described, corresponding components and connections are respectively referenced. The power source for an amplifier as sensitive as the present device requires a somewhat sophisticated power interconnection. For this reason the power supply is drawn in detail at the bottom of FIGURE 1. There is shown a first and second voltage source V1 and V2 serially connected to provide a negative and positive voltage output with respect to the center connection of the two voltage sources. This central common connection is used with a zero voltage level and is connected to ground. As an additional precaution against external interference entering through the power source, the positive and negative voltage leads to the amplifier have been twisted in an attempt to neutralize any such outside interference. This twisted pair is further shielded throughout its entire length.

One end of this shield is connected to the zero voltage point of the serially-connected batteries, and the other end is connected to ground at the amplifier ground connection.

Figure 3:
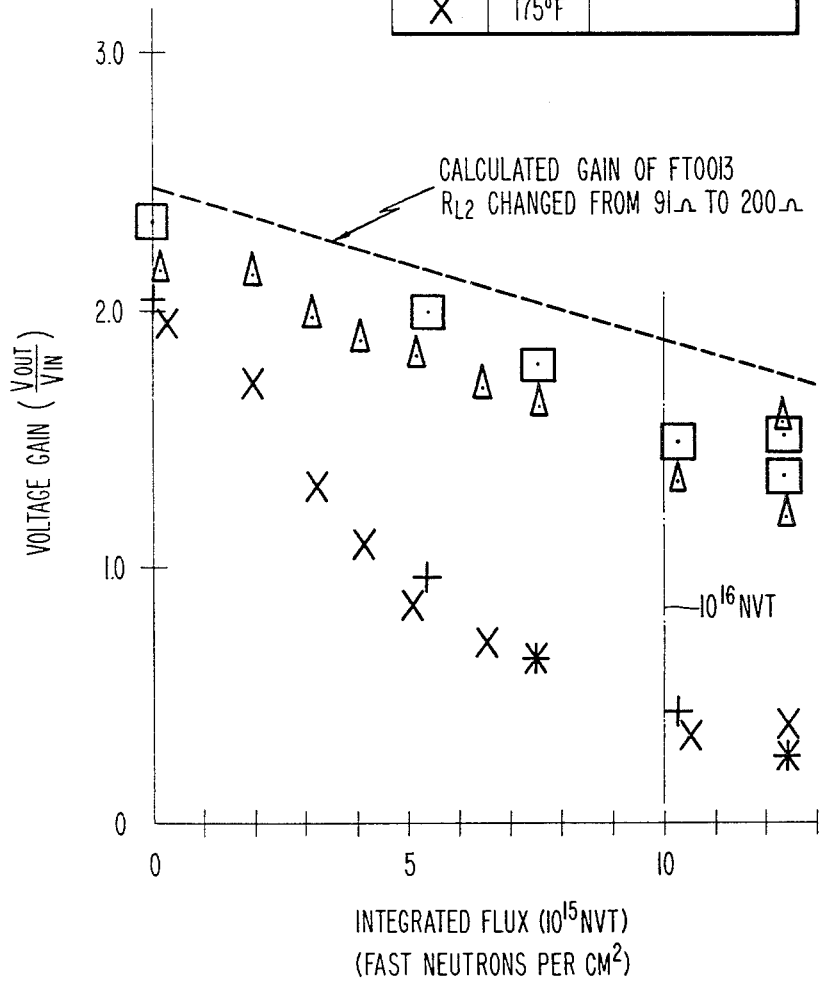
FIGURE 3 is a graphical representation of the voltage gain of the individual transistor amplifiers of FIGURE 1 plotted against the integrated flux and neutrons per square centimeter.
Figure 4:
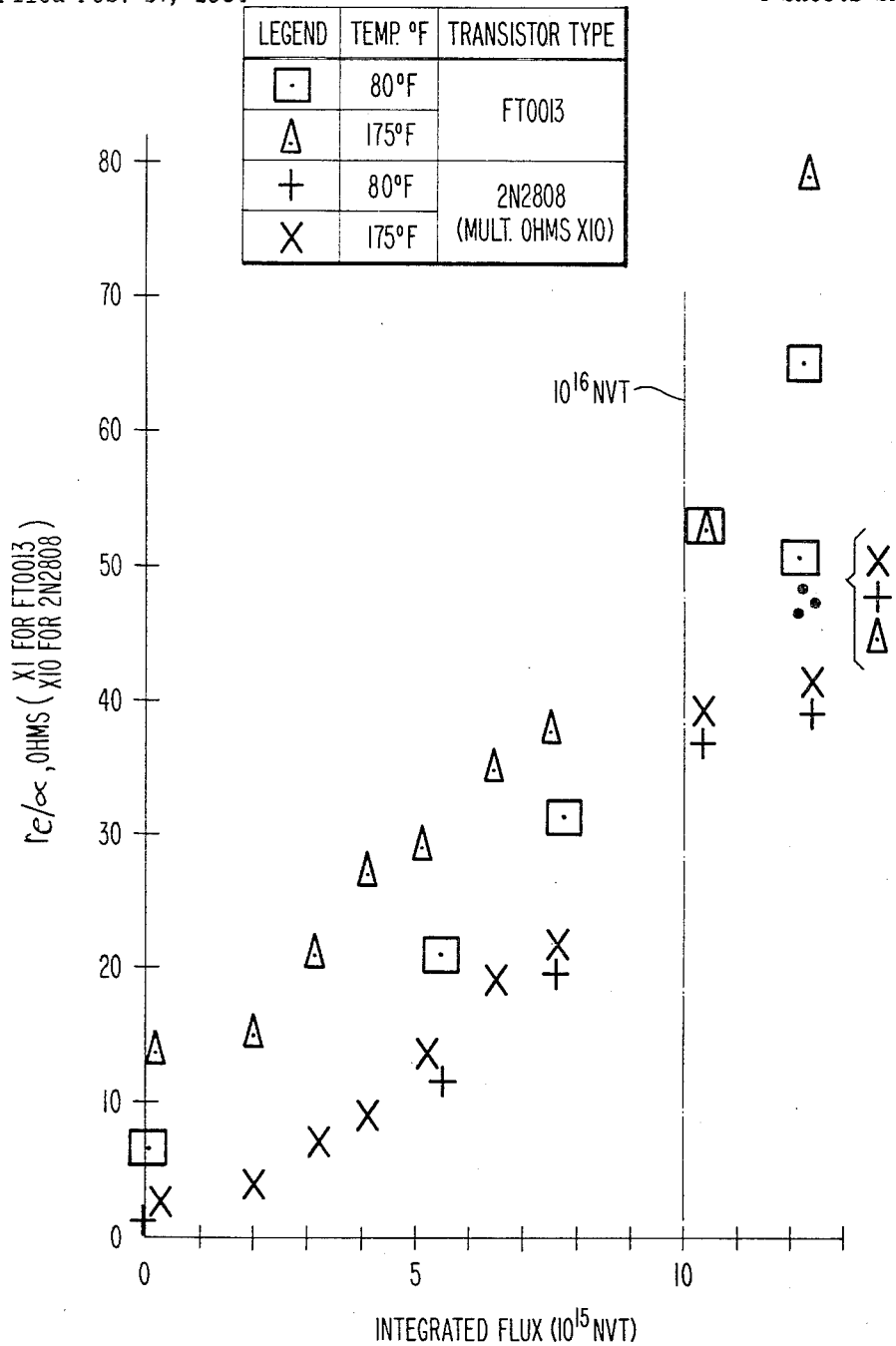
FIGURE 4 is a graphical representation of the same units wherein the emitter resistance is divided by $\alpha$ in ohms. This ratio is plotted against the integrated flux in fast neutrons per square centimeter.

Although the top unit #1 of FIGURE 1 is discussed, as the performance curves of FIGURES 3 and 4 will show, the bottom unit #2 was the more successful device. This resulted from the use of a transistor having a certain base construction to reduce its internal resistance. The use of the present concept will improve the radiation tolerance of any device. However, even better performance is achieved when a transistor of the base type embodied in unit #2 is utilized.

In the common base mode, a transistor base electrode is common to both the amplifier input and output circuits. The noncommon input electrode is the emitter and the noncommon output electrode, the collector.

FIGURE 1 shows an input signal source 10 connected through an interconnecting cable 12 to a terminating resistor 14. The input terminals 16, 18 of the amplifier #1 are connected across the resistor 14 as are the input terminals of amplifier #2. The transistor used in #1 is a high-frequency, thin-base silicon transistor. Amplifier #2 also uses such a transistor; however, its base wafer is constructed in a manner to achieve a low internal resistance base emitter junction. Unit #1 has an input coupling transformer 20 with its primary winding of $N_i$ turns connected across the terminals 16 and 18. The secondary winding of $N_e$ turns on the matching transformer 20 has one end 28 grounded and the other end coupled through capacitor 22 to the emitter electrode $e$ of the N-P-N transistor 30. This emitter electrode $e$ is also connected through resistor 24 to a negative voltage source 26. This emitter resistor $R_e$ supplies a path for the emitter D.C. forward current $I_e$. The base $b$ of transistor 30 is returned to ground 28 through a secondary winding of $N_b$ turns on an output coupling transformer 32 to provide a negative feedback signal from the output transformer to the base and at the same time provide a D.C. path to ground for the base electrode. The collector $c$ of transistor 30 is returned to a positive voltage source 34 through the primary winding of $N_c$ turns on the collector matching output transformer 32.

Another secondary winding of $N_L$ turns on this transformer 32 is connected to supply the output voltage across terminals 36 and 38 of the amplifier. Hereinafter, the transformer windings will be referred to by the nomenclature indicating their turns, i.e., $N_e$, $N_L$, etc.

Since the base electrode $b$ is more positive than the emitter electrode $e$ of the transistor 30, the base-emitter junction of the N-P-N transistor is said to be forward biased. Forward biasing of a P-N junction creates a low impedance path. Conventional D.C. current flows from ground reference connection 28 through the secondary $N_b$ of transformer 32 through the low-impedance base-to-emitter junction and through $R_e$ resistor 24 to a negative voltage source 26. A positive voltage source 34 connected to the collector electrode $c$ through the primary $N_c$ of the transformer 32 causes a reverse bias to exist across the base-to-collector junction. A reverse bias across a P-N junction creates a high impedance path. The P-N junctions are therefore considered to be properly biased for amplifier operation since a low resistance in the input circuit is transferred to a high resistance in the output circuit. It is, of course, this resistance transfer which inspired the term "transistor."

This discussion will intend a negative-to-positive direction when electron flow is specified, as opposed to a positive-to-negative direction when conventional current flow is indicated.

The forward biased emitter-to-base junction of the N-P-N transistor causes an electron flow from the N emitter material toward the base. The base material is invariably specified as having a width which is narrow compared to the mean free path of an electron. That is, the thickness of the base is such that electrons will pass freely through it without danger of excessive collisions or recombinations to hamper or considerably reduce the emitter electron flow. These electrons are said to diffuse through the P base material. Those getting through immediately seek the positively charged collector and an electron flow is created in the collector circuit from the passage of electrons across the base-to-collector junction.

Those electrons not passing through the base become, for all practical matters, electron flow in the base circuit.

Alternately, if conventional current direction is followed, a base current from the base circuit into the emitter circuit causes a current flow from the collector circuit into the emitter circuit.

Since practically all electrons diffuse through the base material to the collector, it is seen that the collector electron flow will approximate the emitter flow Conversely, since all electrons do not pass through the base, the collector current can never equal the emitter current. For a fixed collector voltage the ratio of the collector-to-emitter current flow has been specified as the common base current gain and called alpha ($\alpha$).

Mathematically, this may be stated:

$$\alpha = \frac{I_c}{I_e} \approx 1$$

Practically, the value of $\alpha$ is usually between 0.9 and 0.99.

A second current ratio of importance in transistor operation is the collector current related to the base current. This is specified as the common emitter current gain and is named beta ($\beta$). The invariably small value of base current automatically places a value on $\beta$ much greater than 1. A usual value is in the 10-to-100 range. Thus beta is shown mathematically:

$$\beta = \frac{I_c}{I_b} \gg 1$$

A useful relationship exists between $\alpha$ and $\beta$; thus:

$$\frac{1}{\alpha} = 1 + \frac{1}{\beta}$$

It is seen from this that the closer $\alpha$ is to 1, the larger $\beta$ becomes. Conversely, the larger $\beta$, the closer $\alpha$ approaches unity.

This information is related to the theoretical equation for radiation damage of a transistor by fast neutrons, which is:

$$\Delta\left(\frac{1}{\alpha}\right) = \left(\frac{W^2}{2D_b}\right)\left(\frac{\Phi}{K}\right)$$

where:

$W$ = effective base width;
$D$ = diffusion constant of minority carriers in the base region;
$K$ = radiation damage constant for base region material;
$\Phi$ = integrated flux.

This is noted in I.R.E. Transactions on Nuclear Science, vol. NS–9, January 1962, No. 1 at page 281, in an article entitled "Reactor Irradiation of Semiconductor Devices," by Lyndon Taylor, which provides the theoretical background for operation of the present invention.

The important point to be noted here is the initial small change in $1/\beta$, representing a large loss in beta ($\beta$), occurs with a very small dose $\Phi$.

However, if provision is made to permit large changes in $1/\beta$, for example, two or three, to thereby reduce the effect of $\beta$, then large radiation doses can be tolerated.

For example, if a silicon transistor has a transition frequency $f_T$ equal to 1.5 gc., if it is assumed that K is $1.75 \times 10^5$, and if the initial $\alpha$ is equal to 0.97, then, it can be calculated that $$1 + 1/\beta = 1/\alpha = 1.03 = 0.03 \times 10^{14}\Phi$$

Thus, the circuit of FIG. 1, which works for $\alpha \cong 0.20$, would survive greater than $10^{16}$ nvt; whereas, a circuit requiring, for example, a $\beta$ of 12, would fail at $2 \times 10^{14}$ nvt.

The circuit of FIGURE 1 was designed for operation with $\beta$ as low as $\frac{1}{3}$. Its other design characteristic equations are:

Output impedance $$R_o = \frac{R_c}{\alpha} \cdot \frac{N_L^2}{N_b N_c} \cdot \frac{1}{1 + (1/\alpha - 1)N_b/N_c}$$

Voltage gain (ideal)

$$G_o = \frac{N_e}{N_i} \cdot \frac{N_L}{N_b}$$

Voltage gain $$G = G_o \frac{R_L}{N_L + R_o}$$

Power gain $$P_G = \alpha \frac{G}{G_o} \frac{N_c}{N_b}\left[1 + \left(\frac{1}{\alpha} - 1\right)\frac{N_b}{N_c}\right]$$

Input impedance $$R_i = \left(\frac{N_i}{N_e}\right)^2 \left\{R_e + \alpha R_L \frac{N_b N_c}{N_L^2}\left[1 + \left(\frac{1}{\alpha} - 1\right)\frac{N_b}{N_c}\right]\right\}$$

What has been shown is a transistor amplifer having a high toleration of fast neutron radiation. It accomplishes this feat by the use of a negative feedback loop between the collector and base of a common base connected transistor.

The negative feedback is such as to increase the input impedance and stabilize the voltage gain of the amplifier even for gross variations in transistor characteristics. With a transistor having a narrow base width W, performance of the circuit was successfully demonstrated in a radiation environment of $10^{16}$ fast neutrons/cm.$^2$.

It will be understood that various changes in the details materials, steps and arrangements of parts, which have been herein described and illustrated in order to explain the nature of the invention, may be made by those skilled in the art within the principle and scope of the invention as expressed in the appended claims.

What is claimed is:

1. A radiation-tolerant transistor preamplifier for use in a nuclear radiation environment comprising an N-P-N silicon transistor having a base, emitter and collector electrode, an input coupling transformer with a primary and a secondary winding, a capacitor connected between the secondary winding of said input coupling transformer and the emitter electrode, a resistor connected therefrom to a negative potential source, an output coupling transformer having a primary winding and a first and second secondary winding, said collector electrode connected through the primary winding of the output transformer to a positive potential source, said first secondary winding connected to supply the preamplifier signal output, said second secondary winding connected to said base electrode whereby a degenerative feedback signal is applied to said base electrode.

2. A preamplifier comprising a transistor having a base, emitter, and collector electrode, an input coupling transformer with a primary and a secondary winding, a capacitor connected between the secondary winding of the input transformer and the emitter electrode, a resistor connected therefrom to a first potential source, an output coupling transformer having a primary winding and a first and second secondary winding, said collector electrode connected through the primary winding of said output transformer to a second potential source, said first secondary winding connected to supply the preamplifier signal output, said second secondary winding connected to said base electrode whereby a degenerative feedback signal is applied thereto, causing a reduction in collector current corresponding to an increase in base current.

3. A radiation-tolerant transistor preamplifier circuit for use in a nuclear radiation environment comprising a silicon transistor having a base element with an extremely narrow base width, an emitter element and a collector element, an input coupling transformer with a primary and a secondary winding, a capacitor connected between said secondary winding of the input coupling transformer and said emitter element, a first power source to provide a first polarity voltage, a resistor connected between said first power source and said emitter electrode, an output coupling transformer having a primary winding, a first and a second secondary winding, a second power source to provide a second polarity voltage, said primary winding connected between said collector element and said second power source, a reference voltage terminal, said first secondary winding connected to provide an output signal voltage, said second secondary winding connected between said base element and said reference voltage terminal to apply a negative feedback signal to said base element.

4. A radiation-tolerant transistor preamplifier circuit as set forth in claim 3, wherein said transistor is a high-frequency, thin-base silicon device having its base wafer constructed in a manner to achieve a low internal resistance base-emitter junction.

References Cited
FOREIGN PATENTS 1,210,902  10/1959  France.

ROY LAKE, *Primary Examiner.*

NATHAN KAUFMAN, *Examiner.*

J. B. MULLINS, *Assistant Examiner.*

UNITED STATES PATENT OFFICE
CERTIFICATE OF CORRECTION

Patent No. 3,379,989                                                      April 23, 1968

Philip E. Shafer

It is certified that error appears in the above identified patent and that said Letters Patent are hereby corrected as shown below:

Column 2, line 2, "circuit" should read -- current --.
Column 5, lines 57 and 58, the equation should appear as shown below:

$$\alpha = \frac{I_c}{I_e} \approx 1$$

Column 6, lines 42 and 43, the portion of the equation reading $$\frac{R_c}{\alpha} \quad \text{should read} \quad \frac{R_e}{\alpha}$$

Signed and sealed this 31st day of March 1970.

(SEAL)
Attest:

EDWARD M. FLETCHER, JR.                           WILLIAM E. SCHUYLER, JR.
Attesting Officer                                            Commissioner of Patents